(12) United States Patent
Phan-Anh

(10) Patent No.: US 9,419,955 B2
(45) Date of Patent: Aug. 16, 2016

(54) SYSTEM AND METHOD FOR CARRYING TRUSTED NETWORK PROVIDED ACCESS NETWORK INFORMATION IN SESSION INITIATION PROTOCOL

(75) Inventor: Son Phan-Anh, Budapest (HU)

(73) Assignee: Inventergy Inc., Campbell, CA (US)

( * ) Notice: Subject to any disclaimer, the term of this patent is extended or adjusted under 35 U.S.C. 154(b) by 1350 days.

(21) Appl. No.: 11/691,417

(22) Filed: Mar. 26, 2007

(65) Prior Publication Data

US 2008/0039085 A1    Feb. 14, 2008

Related U.S. Application Data

(60) Provisional application No. 60/786,493, filed on Mar. 28, 2006, provisional application No. 60/789,039, filed on Apr. 3, 2006.

(51) Int. Cl.
| | |
|---|---|
| *H04W 4/00* | (2009.01) |
| *G06F 7/04* | (2006.01) |
| *H04L 29/06* | (2006.01) |
| *H04L 29/12* | (2006.01) |

(52) U.S. Cl.
CPC .......... *H04L 63/08* (2013.01); *H04L 29/12188* (2013.01); *H04L 61/1588* (2013.01); *H04L 63/0492* (2013.01); *H04L 63/0876* (2013.01); *H04L 65/1016* (2013.01)

(58) Field of Classification Search
CPC .................................................... H04W 36/30
USPC .............................................. 455/435.1, 436
See application file for complete search history.

(56) References Cited

FOREIGN PATENT DOCUMENTS

| KR | 1009665160000 | 6/2010 | |
|---|---|---|---|
| WO | WO 2004/045157 | 5/2004 | |
| WO | WO 2005076564 A1 * | 8/2005 | .............. H04L 29/06 |

OTHER PUBLICATIONS

Office Action in Chinese Patent Application No. 200780010857.X, dated May 19, 2011.
Dec. 10, 2015 (EP) Second Examination Report—App. 07734087.5.
Jan. 27, 2015 (EP) Supplementary European Search Report—App. 07734087.5.

(Continued)

*Primary Examiner* — Joshua Schwartz
(74) *Attorney, Agent, or Firm* — Banner & Witcoff, Ltd.

(57) ABSTRACT

Methods, computer code products and systems for authenticating user equipment for access to a trusted network can include receiving a user identity uniquely identifying the user equipment. A proxying entity in the trusted network can generate a network-trusted header including the user identity and forward it to a serving entity in the network. The serving entity performs verification on the received carrier header and can compare the user identity with a list of approved user IDs and if a match is found, the user equipment can be authenticated for access to the network. IBCF that performs optional hiding for the proxying entity toward the Home IMS network can extract the proxying entity-generated parameter out of the encrypted token making it readable to the serving entity if it is encrypted in the carrier header. The proxying entity can also provide verification of the utilized header when processing the registration request from the user equipment. Alternatively the serving entity can be provisioned with data related to NBA support in various proxying entities or domains where proxying entities are located so that the serving entity can decide to proceed with NBA procedure or not for registration received via certain proxying entities or visited networks.

25 Claims, 7 Drawing Sheets

(56) References Cited

OTHER PUBLICATIONS

Tiina Koskinen, et al, "IMS_NASS bundled authentication," Internet Citation, Sep. 5, 2005, retrieved from ftp://ftp.3gpp.org/TSG_SA/WG3_Security/TSGS3_40_Solvenia/Docs/03-050548.zip, 6 pages.

"Issues with Coexistence between NASS bundled authentication (NBA) and Early IMS Security (EIS)," ETSI-S3-060192, Mar. 20, 2006, retrieved from ftp://www.3gpp.org/tsg_sa/WG3_Security/TSGS3_43_Athens/Docs, 9 pages.

"Telecommunications and Internet Converge Services and Protocols for Advanced Networking (TISPAN) IP Multimedia Call Control Protocol based on Session Initiation Protocol (SIP) and Session Description Protocol (SDP) Stage 3," protocol specification 3GPP TS. 24.229 (Release 7), modified, European Telecommunications Standards Institute (ETSI), ETSI ES 283 003 v1.1.1, Feb. 14, 2006, 72 pages.

Feb. 16, 2015 (EP) Communication pursuant to Article 94(3) EPC—App. 07734087.5.

Mar. 17, 2008 (WO) International Preliminary Report on Patentability—App. PCT/IB2007/000758.

"Detailed specification of registration and authentication procedures based on LS from CN1 (S3-041048)." 3GPP TSG SA WG3 Security S3#36, Nov. 23-26, 2004, Shenzhen, China, p. 1-11.

Garcia-Martin et al., "Private header (P-Header) extensions to the session initiation protocol (SIP) for the $3^{rd}$-generation partnership project (3GPP)." RFC 3455, Jan. 2003, retrieved from: http://www.ietf.org/rfc/rfc3455.txt.

3GPP TR 33.978 v6.6.0 (Dec. 2006), Technical Report, $3^{rd}$ Generation Partnership Project; Technical Specification Group Services and System Aspects; Security aspects of early IP multimedia sybsystem (IMS) (Release 6), retrieved from: http://www.arib.or.ip/IMT-2000/v630Sep07/3_T12/ARIB-TR-T12/Re16/33/A33978-660.pdf.

International Search Report for PCT Application No. PCT/IB2007/000758.

* cited by examiner

SYSTEM AND METHOD FOR CARRYING TRUSTED NETWORK PROVIDED ACCESS NETWORK INFORMATION IN SESSION INITIATION PROTOCOL

CROSS-REFERENCE TO RELATED APPLICATIONS

The present application claims priority to U.S. Provisional Patent Application No. 60/789,039, filed Apr. 3, 2006, and U.S. Provisional Patent Application No. 60/786,493, filed Mar. 28, 2006.

FIELD OF THE INVENTION

The present invention relates generally to authentication in a communication network. More particularly, the present invention relates to carrying access-network information for authentication purposes.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Telecom and Internet Converged services and Protocols for Advanced Networks (TISPAN) provides user authentication concepts for IP Multimedia Subsystem (IMS) based services. TISPAN has introduced Network Attachment Subsystem (NASS) bundled authentication (NBA) that uses network-recognized access information, particularly the line-id, for authentication purposes. The line-id is obtained by a Proxy Call Session Control Function (P-CSCF) from the access network and delivered to the Serving Call Session Control Function (S-CSCF) by the P-CSCF in the P-Access-Network-Info header to be used as a base for authentication purposes. However, this approach is less than ideal.

First, the P-Access-Network-Info header, as currently defined in RFC3455, is generally designated for carrying information from user equipment (UE) to the network (NW). This header is not configured for carrying access-info from one network element to another. In fact, this type of usage is specifically prohibited by RFC3455.

In addition, introducing this deviation in handling of the P-Access-Network-Info (P-A-N-I) into the P-CSCF can cause compatibility problems and even security holes in the system when both "NBA-aware" and legacy "Non-NBA-aware" P-CSCFs (such as ones presented in already deployed 3GPP R5/R6 systems) co-exist. As illustrated in FIG. 1, a UE attached to a legacy P-CSCF can put false line-id information into the P-A-N-I. In this case, the legacy P-CSCF will not touch the P-A-N-I, so this false line-id information can make it to the S-CSCF. If the S-CSCF uses this false information as a basis for NBA, then the offending UE may get authenticated based on this false information. Even if the offending UE were attached to an "NBA-aware" P-CSCF, the P-CSCF would be required to screen the content of all P-A-N-I in order to block the attached. This could adversely impact system performance.

As such, there is a need for improved authentication systems and methods which address the compatibility, security and performance problems of current solutions.

SUMMARY OF THE INVENTION

Embodiments of the invention can include method, computer code products and systems for authenticating user equipment for access to a trusted network. The user equipment can be identified by a unique user identity and the trusted network can include a Proxy Call Session Control Function (P-CSCF) and a Serving Call Session Control Function (S-CSCF). The methods, computer code products and systems can include receiving a registration request from the user equipment at the P-CSCF, receiving the user-specific location information such as line-id of the user equipment at the P-CSCF; generating a network-trusted header at the P-CSCF, the network-trusted header including the received user-specific location information; forwarding the network-trusted header toward the S-CSCF for authentication, comparing the user-specific location information to a list of approved user-specific location information in the S-CSCF, and if a match is found, authenticating the user equipment for access to the trusted IMS network. A network-trusted header can be a header including content the network entities of the communication system can trust because the network entities know that the content of the header comes from another trusted network entity, and not, for example, a malicious user equipment.

The network-trusted header can include a parameter into which the user-specific location information can be inserted. The parameter, which have any name but is referred to herein as pani-np, can have the following example syntax:

pani-np="<information field name 1>-eq-<information field value 1> . . . <information field name n>-eq-<information field value n>"

where n=the number of information fields included in the parameter.

The most notable user-specific location information carried in pani-np is line-id, however other information may be carried as well. Generally speaking, any header generated by the P-CSCF when handling a REGISTER in both NBA-aware P-CSCF's and non-NBA-aware P-CSCF's can be used as network-trusted headers for carrying the pani-np header. Examples can include P-Visited-Network-ID, Via, Path, P-Charging-Vector headers, etc.

Embodiments of the invention can include further verification of the utilized network-trusted header by the S-CSCF to ensure that the carried pani-np parameter has been inserted by the P-CSCF and not some other entity. This verification can be based on information available to the S-CSCF which can be used to identify abnormalities in the utilized carrier header that can be caused by malicious user equipment putting false pani-np information into the header and attempting to make it appear as if the information was inserted by a P-CSCF.

The rules and constraints derived from standard behavior of a P-CSCF and user equipment in handing a REGISTER can be used for conducting the verification. Other "local knowledge" of the S-CSCF can also be used. For example, when the utilized network-trusted header is a P-Visitied-Network-ID (P-V-N-I) header, the number of headers in the REGISTER received at the S-CSCF is well known in the IMS architecture. This knowledge can be used as criteria for conducting the verification. For example, if a malicious user equipment puts additional P-V-N-I headers into the list, than the number of items in the P-V-N-I header list received by the S-CSCF will be larger than expected. This can be used to signal a possible problem and verification would fail in this case. Similar rules apply for P-Carging-Vector headers (e.g. the number of such headers in REGISTER received by the S-CSCF is well known).

Embodiments of the invention also comprise further verification of the utilized network-trusted header by the P-CSCF. This can also be used to recognize possible malicious insertion of header information by a user equipment. According to the IMS architecture, the REGISTER received by the P-CSCF from the user equipment contains only one Via header, no Path header, no P-Visited-Network_ID and no P-Charging-Vestor header. If P-CSCF recognizes more than one Via header, or any of the other listed three headers then a potential fraud from the user equipment side can be recognized and the P-CSCF can reject the request.

Embodiments of the invention can further comprise digitally signing the received user identity by the P-CSCF and verifying the digital signature at the S-CSCF. The trusted network can be an IP Multimedia Subsystem.

The Interconnect Border Control Function provides overall control of the boundary between different service provider networks. It can provide security for the IMS core network in terms of signaling information by implementing a Topology Hiding Inter-network Gateway (THIG) sub-function. This sub-function can perform signaling based topology hiding, IPv4-IPv6 inter-working and session screening based on source and destination signaling addresses. In some situation, topology hiding may exist between a Home IMS network and a Visited IMS network.

If topology hiding is being applied to a P-CSCF in a Visited IMS network and encryption of the utilized carrier header is applied, then the Interconnection Border Control Function (IBCF) performing the hiding can remove the aforementioned pani-np parameter from an encrypted token so it remains readable for S-CSCF.

In an alternative embodiment of the invention, the user-specific location information can continue to be sent in the P-A-N-I and the S-CSCFs can be provisioned with data that shows which P-CSCFs are NBA-aware and which ones are not. In this manner, the S-CSCF can decide whether or not the NBA procedure is applicable to registration based on which P-CSCF is sending the information. The list can be P-CSCF specific, domain specific (applicable to all P-CSCF inside that domain), or configured by IP address ranges. There can be white list (which P-CSCFs are NBA-aware) or black-list (which ones are not NBA-aware). The S-CSCF can check the P-CSCF names/IP address or the domain where the P-CSCF is located against its list to decide whether the NBA procedure is applicable to registration arriving via a particular P-CSCF.

Embodiments of the invention can include methods, computer code products and systems for authenticating user equipment for access to a trusted network. The user equipment can be identified by a unique user identity and the trusted network can include a Proxy Call Session Control Function (P-CSCF) and a Serving Call Session Control Function (S-CSCF). The methods, computer code products and systems can include receiving a registration request from the user equipment at the P-CSCF, receiving the user-specific location information such as line-id of the user equipment at the P-CSCF; inserting the user-specific location information in P-Access-Network-Info in the P-CSCF; forwarding the P-A-N-I header toward the S-CSCF for authentication, determining at the S-CSCF whether the forwarding P-CSCF is NBA aware, and if so comparing the user-specific location information to a list of approved user-specific location information in the S-CSCF. If a match is found, the user equipment can be authenticated for access to the trusted IMS network. As mentioned, in these embodiments of the invention S-CSCF can be be provisioned with data that shows which P-CSCFs are NBA-aware and which ones are not.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
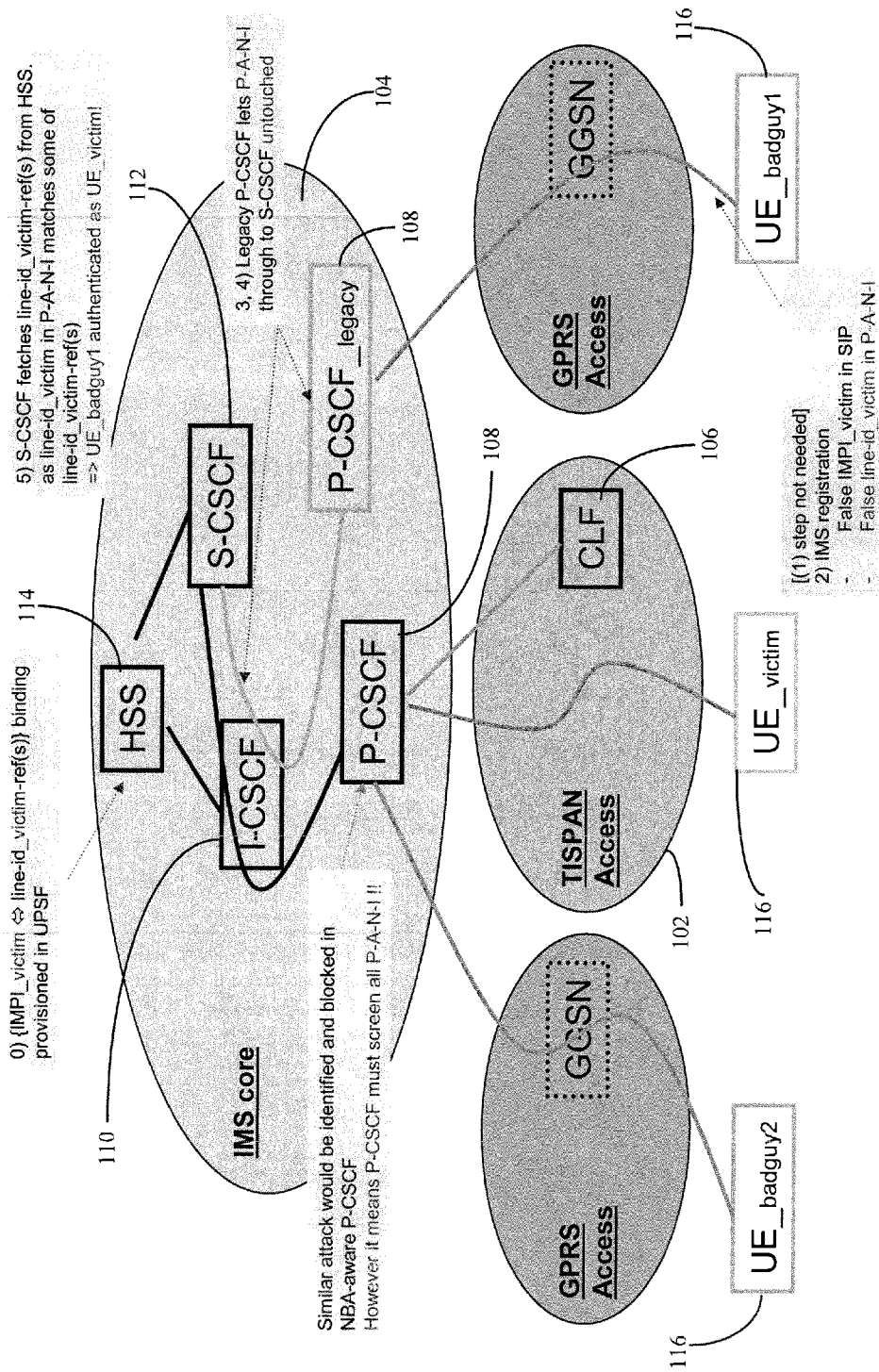
FIG. 1 is a overview diagram of a TISPAN authentication system illustrating potential problems with existing systems.
Figure 2:
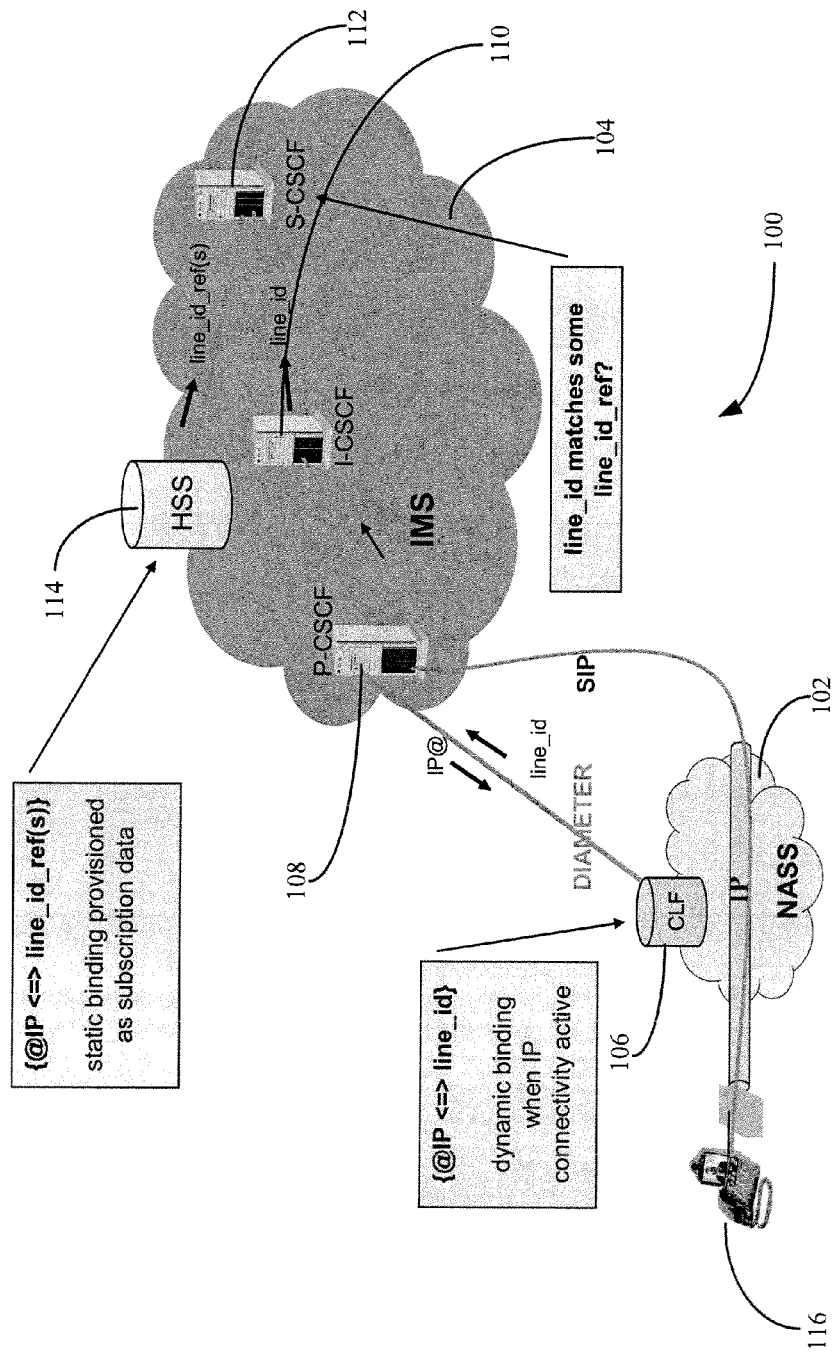
FIG. 2 is an overview diagram of a TISPAN Release 1 architecture system within which the present invention may be implemented.

Embodiments of the invention relate to authenticating access to the core IMS subsystem and in particular, TISPAN access to the core IMS subsystem. Turning to FIG. 2, the TISPAN Release 1 architecture, generally designated by reference number 100, comprises several subsystems. Of particular interest from the point of view of NASS bundled authentication (NBA) are the NASS subsystem 102 and the IMS subsystem 104. The NASS subsystem 102 includes a Connectivity session Location and repository Function (CLF) 106. The CLF 106 can be configured to handle binding of allocated IP addresses and line_id. The IMS subsystem 104 comprises a P-CSCF 108, an Interrogating Call Session Control Function (I-CSCF) 110, a S-CSCF 112, and a Home Subscriber Server (HSS) 114. User Equipment (UE) 116 can be granted access to the IMS subsystem 104 through the NASS subsystem 102.

The P-CSCF 108 is an IMS element that can be identified as the UE's first contact point within the IP Multimedia Core Network (IM CN). Functions of the P-CSCF 108 can include forwarding SIP messages received from the UE 116. The messages may be sent to the I-CSCF 110 or S-CSCF 112, depending on the type of message and procedure being carried out. The P-CSCF 108 can also be responsible for generating a Call Detail Record (CDR). The P-CSCF address can be discovered as part of the session management procedure involved with establishing IP connectivity. That is, the P-CSCF address may be provided during the Packet Data Protocol (PDP) context activation process. Alternatively, the address may be resolved after the PDP context activation process through the Dynamic Host Configuration Protocol Query/Response process. In this case, the UE 116 may request an IP address plus other variables in order to establish an IP session.

The I-CSCF 110 is an IMS element that can provide a contact point within an operator's network, allowing subscribers of the network, or roaming subscribers, to register.

Generally speaking, the I-CSCF 110 deals with registration, routing and forwarding of SIP messages and charging.

The S-CSCF 112 is an IMS element that provides session control services for the UE 116. This enables the network operator to support various services. S-CSCF functions can include management of mobile registrations, maintaining of sessions, interaction with other services, charging and security. In one embodiment, the S-CSCF 112 is a SIP Server. It's responsibility can include interacting with network databases, such as the HSS 114, on mobility and access, authorization and accounting servers for security. As part of the SIP registration process, a user will generally be allocated an S-CSCF 112 that resides in the subscriber's Home Public Land Mobile Network. This S-CSCF 112 will be responsible for all aspects of session control for the subscriber.

The HSS 114 is generally the master database for the Public Land Mobile Network. It can be responsible for various functions such as User Mobility Server, Home Location Register, Domain Name Servers, and security and network access databases. While it is logically viewed as one entity, in practice it can be made up of several physical databases, depending on the number of subscribers and the extent of the services which need to be supported. The HSS 114 can hold variables and identities for the support, establishment and maintenance of calls and sessions made by subscribers. This can include the subscriber's International Mobile Subscriber Identity, security variables and location information Besides providing basic Home Location Register/Authentication Center functions, the HSS 114 may be enhanced through the use of additional databases and reference points. This can enable the network to offer the subscriber advanced services and features by interfacing with service application servers based on Customized Application for Mobile network Enhanced Logic (CAMEL), Open Service Access (OSA) and SIP.

Embodiments of the present invention relate to authenticating UE 116 access to the IMS subsystem 104. In various embodiment of the invention, this can be accomplished by carrying network recognized access information, such as line-id, in a parameter of a mandatory carrier SIP header at the P-CSCF 108 instead of in the P-A-N-I. A network-trusted header is a header of which content the network entities of the communication system can trust so that the network entities know that the content of the header must come from another trusted network entity, and not e.g. from a malicious UE. In one embodiment, the parameter is named pani-np (P-A-N-I-network-provided) and comprises a quoted string that contains the line-id to be reported by the P-CSCF 108 to the S-CSCF 112. Other relevant access information, such as access-type, can also be included.

In one embodiment, the pani-np parameter can be arranged in the following format.

pani-np="<parameter name 1>-eq-<parameter value 1> . . . <parameter name n>-eq-<parameter value n>"

where 1 to n parameters can be included in the pani-ip parameter. For example, when a Via header is utilized as the network-trusted carrier header, if the line-id=1234567890 and the access-type was dsl, the topmost Via header added by P-CSCF 108 could be changed from SIP/2.0/UDP pcscf1.visited1.net; branch=z9hG4bK240f34.1 to
SIP/2.0/UDP pcscf1.visited1.net; branch=z9hG4bK240f34.1; pani-np="lineid-eq-1234567890 accesstype-eq-dsl"

If the same example is applied to a P-V-N-I, the following change would occur:

P-Visited-Network_ID:"Visited Network Number 1" changes to
P-Visited-NetworkID: "Visited Network Number 1"; pani-np="lineid-eq-1234567890 accesstype-eq-dsl"

In this example, the NW (P-CSCF 108) would be telling the S-CSCF 112 that the access type is DSL and the line-id is 1234567890.

By implementing embodiments of the invention, the P-CSCF 108 would implement NBA by using the parameter pani-np in a mandatory network-trusted header generated by the P-CSCF to carry line-id information instead of using P-A-N-I. Replacement of this non-compliant usage of P-A-N-I provides a SIP-compliant way to carry the necessary access information, such as line-id, from P-CSCF 108 to S-CSCF 112 for implementing NBA in SIP. Embodiments of the invention do not require a new SIP header and thus solve the legacy, non-NBA-aware P-CSCF problem. If the line-id information is carried in a new SIP header or even some existing headers, then those headers may not be checked by a legacy P-CSCF allowing fraudulent information to make it to the S-CSCF. The network-trusted header is always constructed by the P-CSCF 108, but only NBA-aware P-CSCF put the pani-np parameter in that header. As such, a legacy P-CSCF willalways generate that header but will not insert the pani-np parameter in its the carrier header and UE will not be able to push false line-id information to the S-CSCF in legacy systems.

In one embodiment of the invention, the S-CSCF performs verification on the received carrier header for example, based on the rules and constraints derived from standard behavior of the P-CSCF and UE. For example. If the utilized carrier header is P-V-N-I, one possible verification check can be done by comparing the number of items in the P-V-N-I header list received at the S-CSCF against the well known result derived from normative IMS SIP signaling flow. Similar verficiation criteria can apply for P-Charging-Vector. In another embodiment, the P-CSCF can also provide verification on the REGISTER message related to the utilized network-trusted header to filter out malicious insert of that header by UE. For example, the P_CSCF can reject the REGISTER request if there is more than one Via header in it or if it contains any P-Visited-Network-ID, Path or P-Charging-Vector headers.

In one embodiment of the invention, the pani-np information can be digitally signed by the P-CSCF 108 to provide further security to the authentication process. In this case, the S-CSCF 112 can verify the digital signature on the pani-np before proceeding with authentication.

Embodiments of the invention can be generalized to carry any trusted information from one SIP node to another. This trusted information could be carried as an extension parameter in some selected mandatory carrier header generated by the corresponding node. If there is hop-by-hop trust from source node (P-CSCF in this case) to receiving node (S-CSCF in this case), then the nodes before the source node (UE in this case) can not push false information to a receiving node utilizing the SIP default behavior of "don't touch it if I don't understand it" for legacy network nodes.

Figure 3:
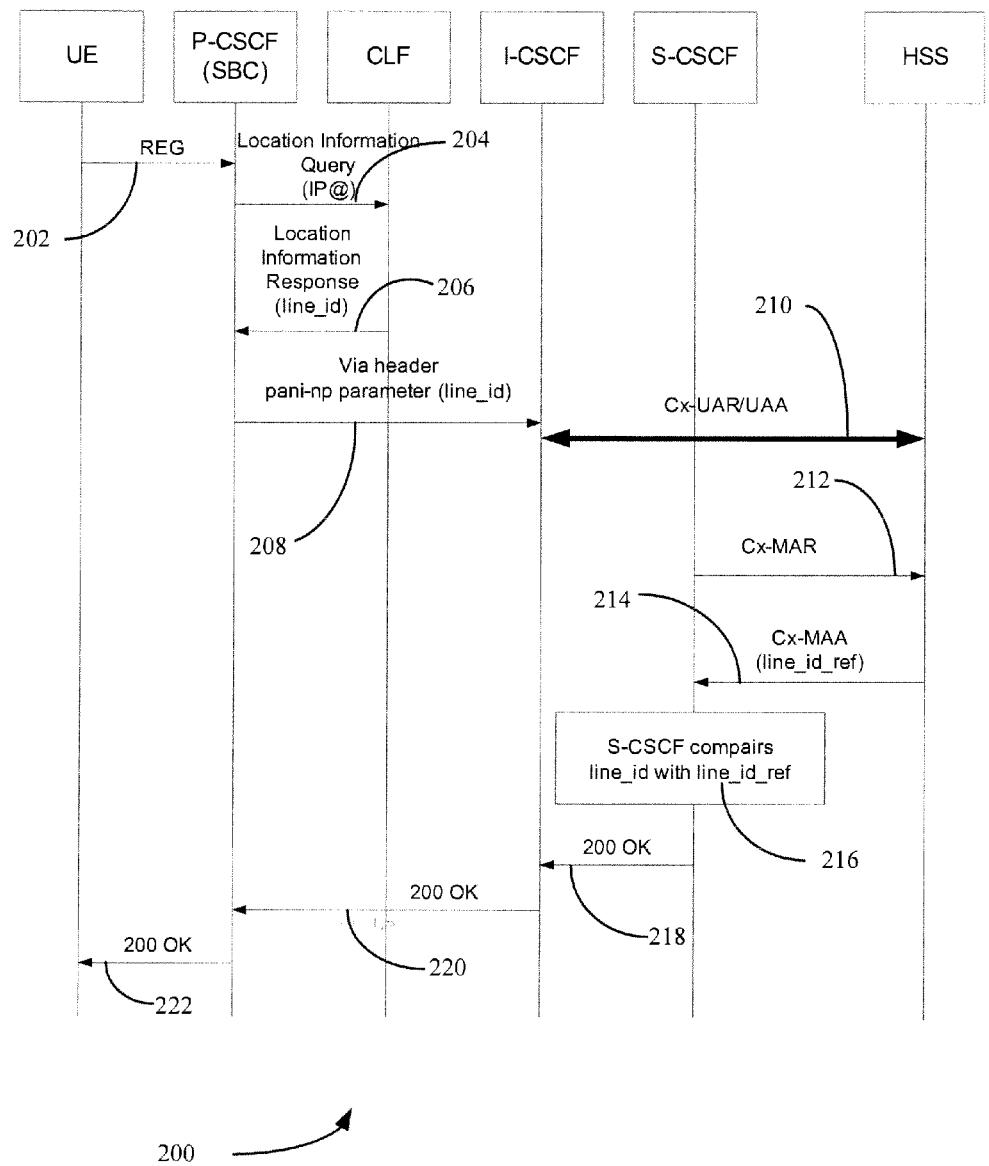
FIG. 3 is a signaling flow diagram that can be used in the implementation of one embodiment of the present invention.
Figure 4:
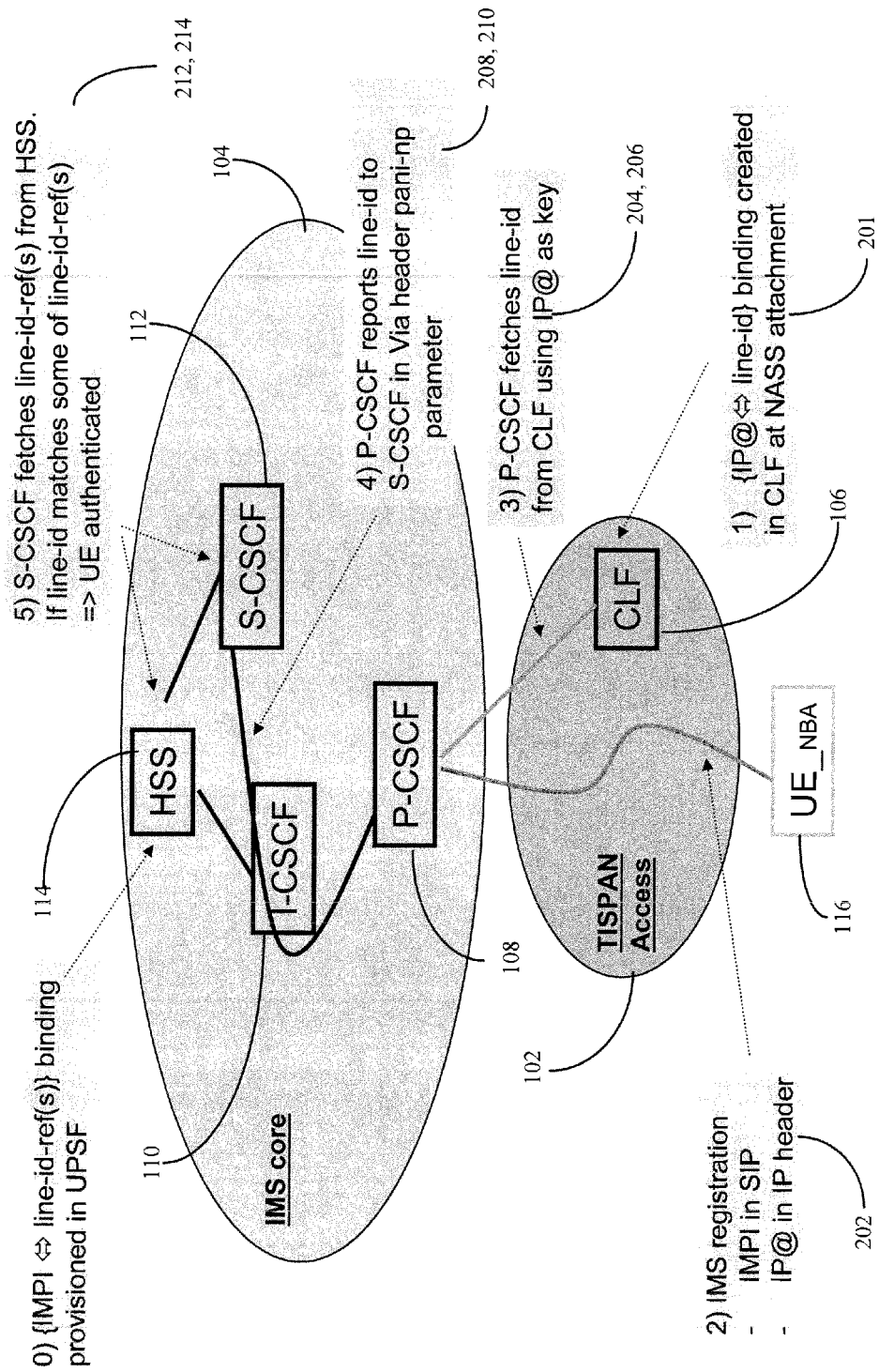
FIG. 4 is a overview diagram of a TISPAN authentication system according to one embodiment of the present invention.

FIG. 3 illustrates the signaling flow 200 for a successful registration attempt using NBA according to one embodiment of the present invention and FIG. 4 illustrates an overview of the TISPAN authentication system according to one embodiment of the present invention. In this embodiment, the UE 116 performs access-level attachment to the NASS subsystem 102 so that it is assigned an IP address and the IP connectivity is enabled (step 201). Then, in step 202, the UE 116 sends a REGISTER message to the P-CSCF 108 to initiate registration with the IMS subsystem 104. The REGISTER message may or may not include an Authorization header.

Upon receiving the REGISTER message, the P-CSCF can 108 perform a verification ont eh network-trusted header selected for carrying location information, for example checking to make sure there is only one Via header and no P-Visited-Network_ID, Path, P-Charding-Vector in the Register. The P-CSCF 108 can then perform a location information query, step 204, to the CLF 106. For example, the P-CSCF 108 can have multiple network interfaces connected to different access networks. In that case, the P-CSCF 108 can be configured to perform NBA-related functionality per network interface. The CLF address can also be determined by configuration means per network interface. The source IP address seen in the IP header can be used as a key for the location information query. The P-CSCF to CLF interface is denoted as e2 interface in the TISPAN architecture. This is a DIAMETER-based interface. Furthermore, at subscription time, the NBA is provisioned as the authentication scheme for the UE 116 and 1 or a set of reference line-id-ref is stored in the HSS 114 for the subscriber.

In step 206, the CLF 106 sends the line-id linked to the allocated IP address back to the P-CSCF 108 using the LocationInformationResponse message. In prior systems, the P-CSCF 108 would encode the received line-id into the "dsl-location" parameter in the P-A-N-I header in the SIP message sent to the I-CSCF 110. A "network-provided" parameter could also be added in the P-A-N-I header to indicate that the line-id is provided by the network. However, as described above, this is a prohibited use of the P-A-N-I that creates compatibility and security problems. According to embodiments of the present invention, the line-id (as well as other information) can be added to a new parameter, the pani-np parameter, in the network-trusted header generated by the P-CSCF 108. According to embodiments of the invention, this information is sent to the I-CSCF 110 and onto the S-CSCF 112 in the network-trusted header in step 208. In addition, the P-CSCF 108 can digitally sign the pani-np parameter information for added security.

In step 210, the I-CSCF 110 can perform the UAR/UAA Cx operation with HSS 114 to locate the S-CSCF 112. Since the line-id is passed in a network-trusted header it can be extracted by the S-CSCF 112. If the pani-np parameter was digitally signed by the P-CSCF 108, then the S-CSCF 112 can verify the digital signature. In steps 212 and 214, the S-CSCF 112 can perform the MAR and MAA operations, respectively, with the HSS 114. The HSS 114 can send one or more reference line-id-ref parameters and can also confirm or indicate that the authentication scheme is NBA.

If the authentication scheme received from HSS 114 confirms that NBA is applied to the UE 116, the S-CSCF 112 can first perform a verification on the received network-trusted carrier header based on rules and constraints derived from normative IMS registration procedure or based on local knowledge or the combination of both. If the verification is successful than the S-CSCF 112 can compare the line-id contained in the pani-np parameter of the Via header (if present and if it includes the "network-provided" parameter), to the reference line-id-ref (line-id-refset) in step 216. If there is at least one match, the user is considered authenticated and 200 OK is sent back toward the UE 116 in steps 218, 220, and 222 to indicate that registration is successful.

The NASS bundled authentication (NBA) works by extending the successful authentication in the NASS layer to the service layer. During the network attachment, the NASS authenticates the UE and allocates an IP address. It stores the layer-2 and layer-3 identities in the NASS profile. When UE registers with the P-CSCF, the P-CSCF queries the NASS (actually the CLF functional entity), to obtain its location information. The P-CSCF embeds the location information into the SIP message in the form of a parameter in the Via header constructed by P-CSCF and forwards it towards the S-CSCF for verification. The S-CSCF verifies this location information with the location information obtained from the UPSF. On successful verification, the user is authenticated at the IMS layer.

It should be noted that if topology hiding applies to P-CSCF toward Home Network then the IBCF performing this hiding shall take this Via parameter out of the encrypted token so it is still readable by S-CSCF. Also, topology hiding may not be applicable or required for NBA At the architectural level, two interfaces are affected:
the 'e2' interface over which the location info from the NASS is communicated.
the 'Cx' interface over which the user profile stored in UPSF is transmitted.

Figure 5:
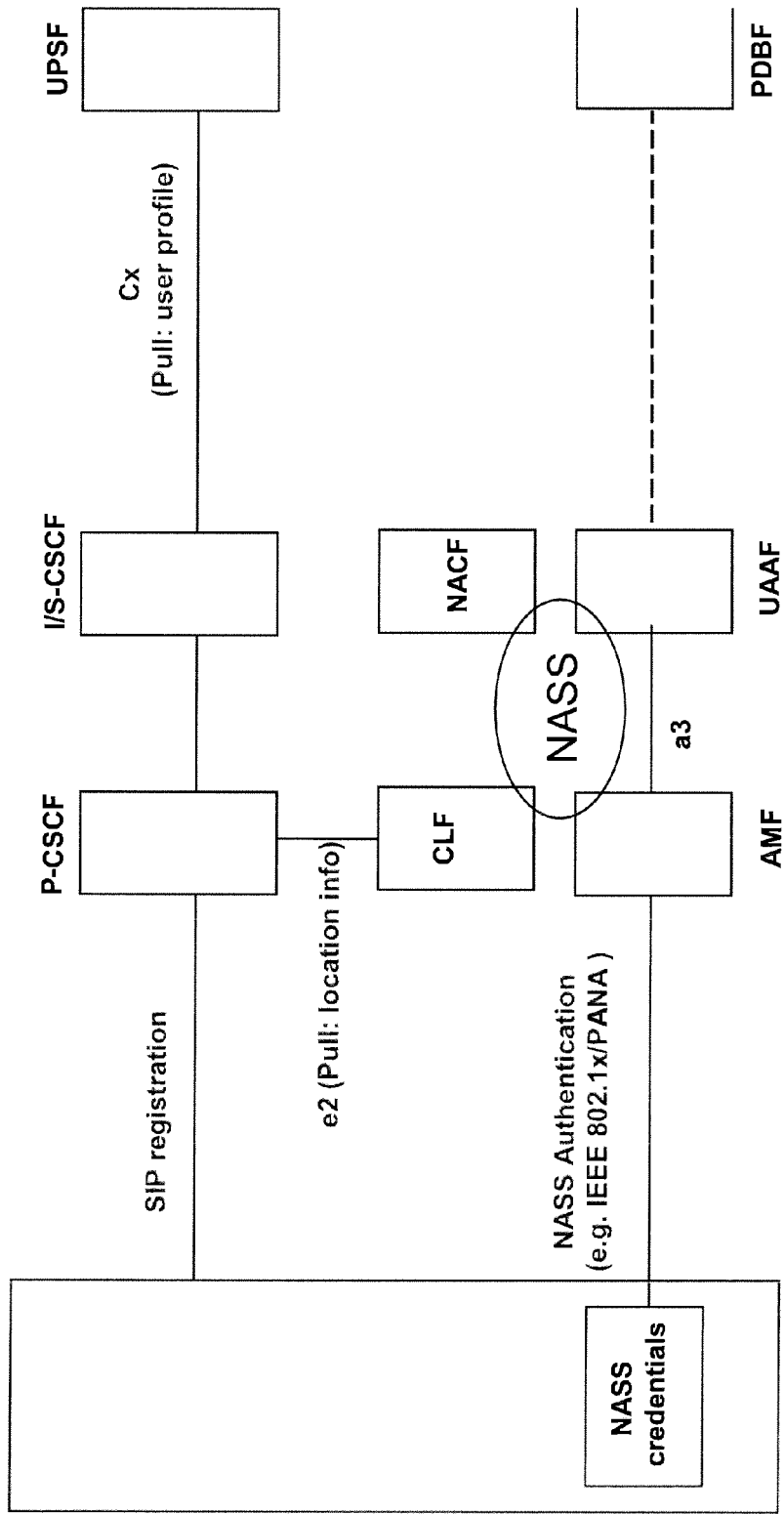
FIG. 5 is a overview diagram illustrating formal mapping of NASS Bundled Authentication according to one embodiment of the present invention.
Figure 6:
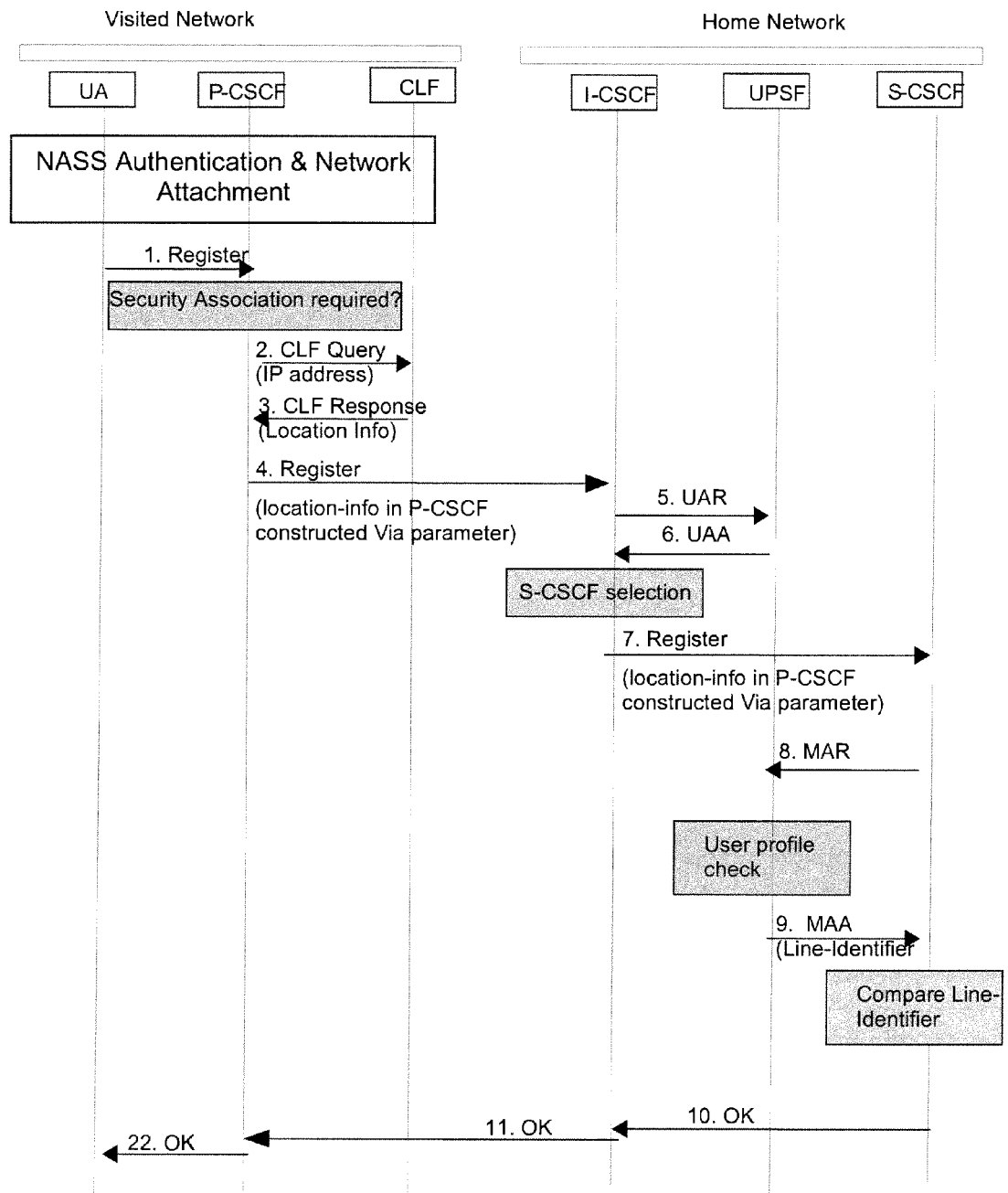
FIGS. 6 and 7 are signaling flow diagrams that can be used in the implementation of one embodiment of the present invention.
Figure 7:
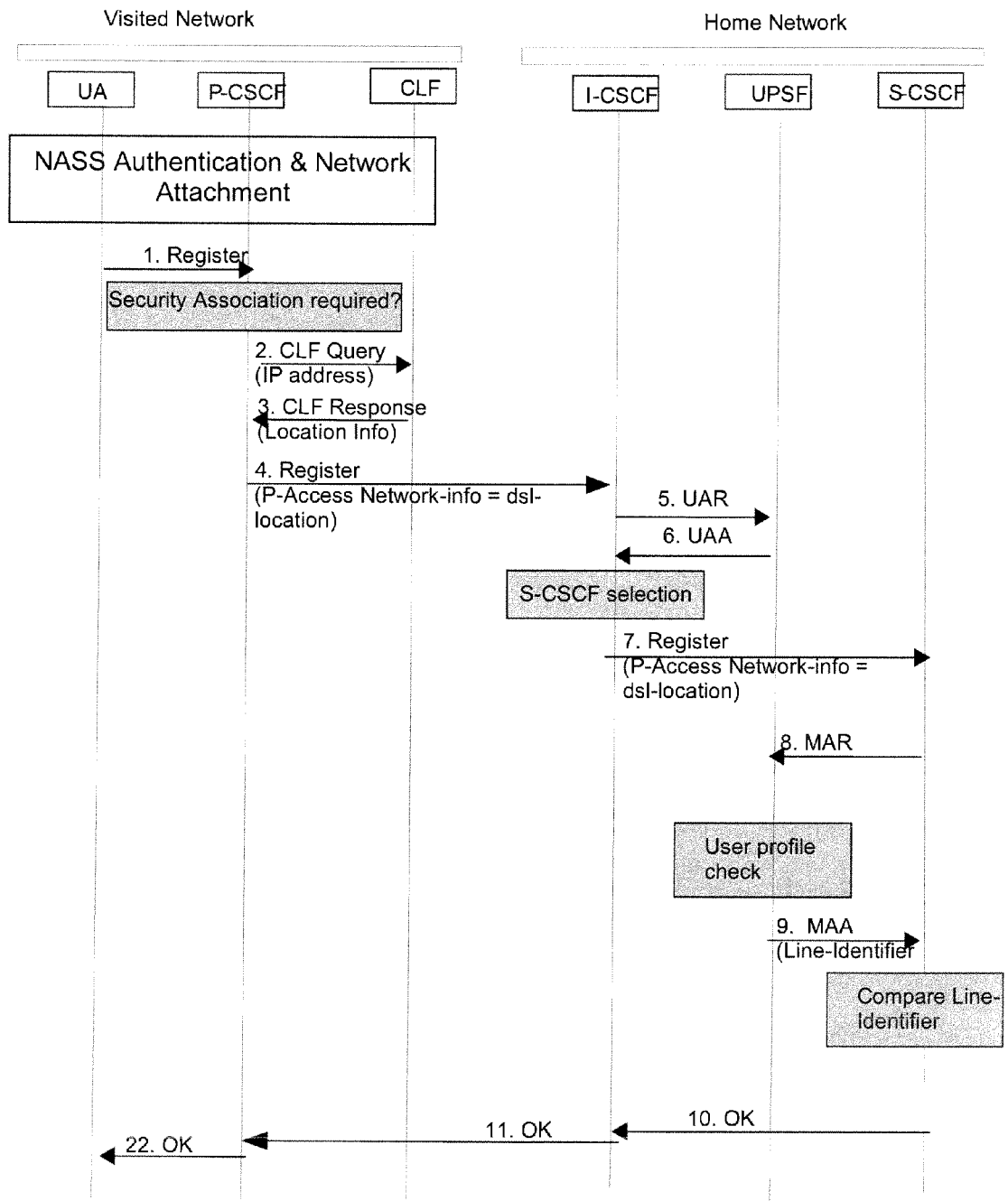

This, as well as a visualization of the network flow, is illustrated in FIGS. 5, 6 and 7.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiment of the present invention have been presented for purposes of illustration and description. It is not intended to be exhaustive or to limit the present invention to the precise form disclosed, and modifications and variation are possible in light of the above teachings or may be acquired from practice of the present invention. The embodiment were chosen and described in order to explain the principles of the present invention and its practical application to enable one skilled in the art to utilize the present invention in various embodiments and with various modifications as are suited to the particular use and contemplated.

I claim:
1. A method comprising:
receiving, by a proxying entity of a trusted network and from a user equipment connected to an access network, a registration request for initiating a registration of the user equipment with the trusted network, wherein the registration request comprises an Internet Protocol (IP) address assigned to the user equipment by the access network;
transmitting, by the proxying entity and to a location information repository of the access network in response to receiving the registration request, a location information query that queries the location information repository for user-specific location information using a key for locating the user-specific location information by the location information repository, wherein the key comprises the IP address assigned to the user equipment by the access network;

receiving, at the proxying entity and from the location information repository in response to the location information query, the user-specific location information of the user equipment;

generating, by the proxying entity, a network-trusted header that comprises the user-specific location information of the user equipment; and transmitting the network-trusted header to a serving entity for authentication.

2. The method according to claim 1, wherein the network-trusted header comprises a parameter into which the user-specific location information is inserted.

3. The method according to claim 1 wherein the user-specific location information comprises a line-id obtained by the proxying entity from the location information repository.

4. The method according to claim 1, wherein the trusted network comprises an IP Multimedia Subsystem.

5. The method according to claim 1, wherein the proxying entity comprises a Proxy Call Session Control Function (P-CSCF).

6. The method according to claim 1, wherein the serving entity comprises a Serving Call Session Control Function (S-CSCF).

7. The method of claim 1, wherein the proxying entity is configured with different network interfaces connected to different access networks;

wherein one of the different network interfaces is a network interface connected to the access network;

wherein receiving the user-specific location information of the user equipment comprises receiving the user-specific location information via the network interface connected to the access network;

wherein the method further comprises determining, by the proxying entity, an address for the location information repository; and wherein transmitting the location information query is based on the address for the location information repository.

8. The method according to claim 1, further comprising:

comparing, by the serving entity, the network-trusted header against at least one normative parameter for the network-trusted header.

9. The method according to claim 8, wherein the network-trusted header comprises a number of items, and wherein the method further comprises:

checking, by the serving entity, the number of items against a known number of items derived from a normative IP Multimedia Subsystem Session Initiation Protocol signaling flow.

10. The method according to claim 1, further comprising:

checking, by the proxying entity, the registration request based on the network-trusted header and constraints derived from one of normative IP Multimedia Subsystem Session Initiation Protocol signaling flows.

11. The method according to claim 10, further comprising:

checking and rejecting, by the proxying entity, a second registration request received from the user equipment based on the second registration request comprising at least one of: more than one network-trusted header, or a P-Visited-network-ID, Path or P-Charging-Vector.

12. The method of claim 1, wherein the network-trusted header is a mandatory carrier Session Initiation Protocol (SIP) header.

13. The method of claim 12, wherein the mandatory carrier SIP header comprises an extension parameter in which the user-specific location information of the user equipment is inserted.

14. The method according to claim 1, further comprising:

digitally signing a user identity received by the proxying entity from the location information repository, resulting in a digital signature;

verifying the digital signature at the serving entity;

comparing, by the serving entity, the user-specific location information to a list of approved location information; and authenticating the user equipment for access to the trusted network.

15. The method according to claim 14, further comprising:

performing, by an Interconnection Border Control Function (IBCF), topology hiding for the proxying entity toward the serving entity; and extracting, by the IBCF, the user-specific location information from an encrypted token so that it becomes readable by the serving entity.

16. The method according to claim 14, further comprising:

determining, by the serving entity, whether NASS Bundled Authentication (NBA) is applicable for authenticating the user equipment based on the proxying entity.

17. The method according to claim 16, further comprising:

receiving, by the serving entity, data comprising a first indication of at least one of a proxying entity name or a proxying entity IP address, a second indication of a domain name of the proxying entity, and a third indication of an IP address range related to the proxying entity; and checking, by the serving entity, the at least one of the proxying entity name or the proxying entity IP address, the domain name of the proxying entity, and the IP address range related to the proxying entity against the data.

18. A non-transitory computer-readable medium comprising computer code that, when executed, causes a computing device to perform the method of claim 1.

19. A system comprising:

a proxying entity of a trusted network, the proxying entity configured to:

receive, from a user equipment connected to an access network, a registration request for initiating a registration of the user equipment with the trusted network, wherein the registration request comprises an Internet Protocol (IP) address assigned to the user equipment by the access network;

transmit, to a location information repository of the access network in response to receiving the registration request, a location information query that queries the location information repository for user-specific location information using a key for locating the user-specific location information by the location information repository, wherein the key comprises the IP address assigned to the user equipment by the access network;

receive, from the location information repository in response to the location information query, the user-specific location information of the user equipment;

generate a network-trusted header that comprises the user-specific location information of the user equipment; and transmit the network-trusted header to a serving entity of the trusted network for authentication; and the serving entity configured to:

compare the user-specific location information of the user equipment to a list of approved location information; and based on the user-specific location information matching an entry in the list of approved location information, authenticate the user equipment for access to the trusted network.

20. The system according to claim 19, wherein the network-trusted header comprises a parameter into which the user-specific location information of the user equipment is inserted.

21. The system according to claim 19, wherein the proxying entity is further configured to digitally sign a user identity received from the location information repository, resulting in a digital signature; and wherein the serving entity is further configured to verify the digital signature.

22. The system according to claim 19, further comprising an Interconnection Border Control Function (IBCF) that is configured to perform optional topology hiding for the proxying entity toward the serving entity, and extract the user-specific location information from an encrypted token so that it becomes readable by the serving entity.

23. The system according to claim 19, wherein the serving entity is configured to determine whether NASS Bundled Authentication (NBA) is applicable for authenticating the user equipment based on the proxying entity.

24. The system according to claim 19, wherein the serving entity is further configured to receive data comprising a first indication of at least one of a proxying entity name or a proxying entity IP address, a second indication of a domain name of the proxying entity, and a third indication of an IP address range related to the proxying entity; and wherein the serving entity is further configured to check the at least one of the proxying entity name or the proxying entity IP address, the domain name of the proxying entity, and the IP address range related to the proxying entity against the data.

25. The system according to claim 19, wherein the trusted network comprises an IP Multimedia Subsystem.

* * * * *